July 26, 1966 R. F. SLOAN 3,263,188
PHASE MODULATOR
Filed Sept. 10, 1963

ROY F. SLOAN
INVENTOR.

BY
Claude Funkhouser
ATTORNEY

3,263,188
PHASE MODULATOR

Roy F. Sloan, Silver Spring, Md., assignor to the United States of America as represented by the Secretary of the Navy Filed Sept. 10, 1963, Ser. No. 308,043
3 Claims. (Cl. 332—23)

Figures 1, 2:
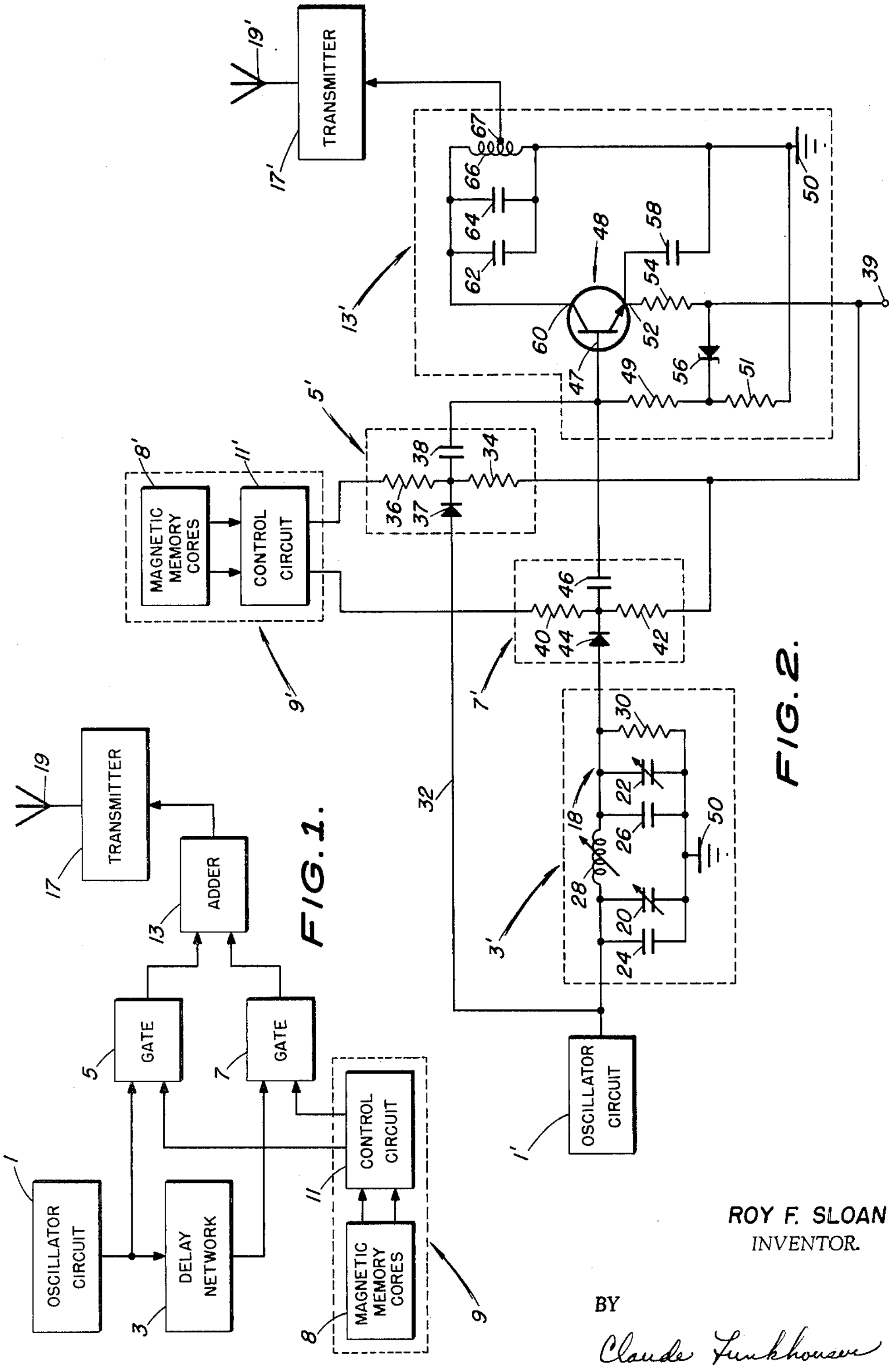

This invention relates to modulators and, more particularly, to a phase modulator employing gating techniques to precisely modulate a Doppler signal.

It is well known that an orbiting satellite carrying a Doppler transmitter may be tracked by measuring discrete changes in the received Doppler signal. Occasionally, a satellite transmits internally generated signals describing its own environmental condition, which signals require a similar transmitting circuit to ground stations. Obviously, a considerable saving in weight and circuitry may be achieved by combining both signals and using a single transmitter. The practicality of such a combination is obvious, however, the method of instrumenting such a combination has heretofore caused difficulty. A successful method of combining the signals is described by Richard T. Ellis et al. in their U.S. patent application entitled, "Phase Modulated Doppler Transmission System," Ser. No. 396,438, filed September 14, 1964. An important consideration in such a dual transmission system is to preserve the accuracy of the Doppler signal, and the instant invention has been conceived to perform this function.

One object of the present invention, therefore, resides in providing a phase modulator which symmetrically modulates a Doppler signal.

Another object of the invention is to provide a phase modulator which contains a minimum number of components and consumes a minimum amount of power.

A further object of the invention is to provide a phase modulator having a reliability suitable for space operation.

Other objects and many of the attendant advantages of this invention will be readily appreciated as the same becomes better understood by reference to the following detailed description when considered in connection with the accompanying drawings, wherein:

FIG. 1 is a block diagram of a phase modulator following the design of the instant invention, and FIG. 2 is a schematic diagram of the phase modulator shown in FIG. 1.

Briefly, the invention consists of two gates, a delay network, and an adding circuit. The signal to be modulated is applied directly to one end of the delay network. The signals at each end of the delay network are sampled by the two gates and then recombined in the adding circuit. The phase difference between these two sampled signals is determined by the length of the delay line and may be as large as 180°. With both gates operating, the recombined signal is in its quiescent condition and represents the unmodulated state. To obtain +60° phase modulation from the quiescent condition, one gate is inhibited and the signal comes through the uninhibited gate; while to obtain a —60° phase modulation from the quiescent condition, the functions of the gates are reversed. An intermediate phase modulation condition may be obtained by controlling the amount of phase delay caused by the delay network.

Referring to FIG. 1, there can be seen a block diagram of the instant invention which includes an oscillator circuit 1 as a carrier wave source. The carrier wave is applied to a delay network 3, and sampled by a phase advance gate 5. The output of the delay network 3 is sampled by a phase retard gate 7. A magnetic core portion 8 of a memory 9 contains the control signals representative of the information which is to be impressed upon the carrier wave as phase modulation. The output of the magnetic core section of the memory 9 is applied to a control circuit section 11 of the memory, which section operates as a buffering stage and a switching circuit for regulating the operation of the gates 5 and 7.

A binary one or zero from the memory requires a complex combination of various functions to describe each respective condition. For purposes of this discussion, the binary one state is described by requiring first a 60° phase advance followed by a 60° phase retard than a quiescent period equal to the sum of the phase advance and phase retard periods. The binary zero state may be described by requiring first a 60° phase retard followed by a 60° phase advance and a quiescent period equal to the sum of the phase retard and phase advance periods.

The control circuit 11 operates to regulate the operation of the gates 5 and 7 by alternately or concurrently opening or closing either or both gates. The outputs of gates 5 and 7 are applied to an adder circuit 13 for recombination of the carrier wave. The output of the adder is applied directly to a transmitter 17, which broadcasts the combined signal by means of an antenna 19.

In FIG. 2, a preferred embodiment of the invention is shown which operates at a frequency of 50 megacycles. The circuits of the invention which have the same function as the blocks in FIG. 1 retain the same numbers raised to their prime. The oscillator circuit 1' again furnishes the carrier wave signal and applies it to the delay circuit 3', which consists of a pi-filter 18 having a pair of variable capacitors 20 and 22 in each of its legs, a pair of fixed capacitors 24 and 26 in each of its legs and a variable inductor 28 connected between said legs. The filter is terminated in a low value resistor 30.

The gate 5' bypasses the delay network 3', and is directly connected to the oscillator circuit 1' by a line 32. Specifically, the gate 5' consists of a pair of resistors 34 and 36 for developing a biasing voltage for a diode 37, which diode is connected between the junction of said resistors and the oscillator circuit 1', and an isolation capacitor 38, connected to the same junction. The pair of resistors 34 and 36 are connected between the control circuit 11' and a potential source terminal 39 of minus 12 volts. The gate 7' receives its input signal from the delay network 3', and said gate includes a pair of resistors 40 and 42 for developing a biasing voltage for a diode 44. Said diode 44 is connected between the junction of said resistors and the delay network 3'. Additionally, an isolation capacitor 46 is connected to the same junction. The resistors 40 and 42 are also connected between the control circuit 11' and the potential source terminal 39. The control circuit 11' performs its regulation by connecting the biasing resistors to ground potential, thus completing the diode biasing circuit from the potential source terminal 39 through resistors 34 and 36, or 40 and 42 to ground. The closing of this circuit removes the back biasing voltage from the diodes 37 and 44, thereby permitting them to conduct and to pass their signals to the adding circuit 13'.

The capacitors 38 and 46 are both connected to the base lead 47 of a transistor 48. The addition of both signals from the capacitors is performed over a resistor 49 which is also connected to the base lead 47 of the transistor 48. The other end of the resistor 49 is connected to ground 50 by a biasing resistor 51. The emitter lead 52 of the transistor 48 is connected to the potential source terminal 39 by a resistor 54. The junction of the resistor 54 and the terminal 39 is connected to the junction of the resistors 49 and 51 by a Zener diode 56. The Zener diode is connected so as to provide a negative reference potential to the base lead 47. A filter capacitor 58 is connected between the emitter lead 52 and ground 50.

The collector lead 60 of the transistor 48 is connected to ground by the parallel connection of a pair of capacitors 62 and 64 and an output transformer 66. The output signal for the transmitter 17' is taken from the transformer 66 by an output tap 67 located near the grounded end of said transformer.

In operation the instant invention reacts in response to other circuits associated with a Doppler transmission system. The oscillator circuit generates the basic timing frequency used throughout the satellite, and associated frequency multipliers to raise the basic timing frequency to the desired transmitting frequency. The control circuit 11' may include transistor switches which operate in response to signals stored in the magnetic core portion of a memory circuit. The Doppler signal passes through the gates 5' and 7', in response to the control circuit regulating signals.

The Doppler frequency is applied directly to the gate 5' and the delay network 3', which network introduces a phase delay of up to 180°. Samples of the delayed signal and the original signal are then passed through the gates 5' and 7' as described above. Their addition is achieved over the resistor 49, and the new signal is amplified by the transistor 48 and is transmitted by the satellite Doppler transmitter 17'.

Component values which have been selected for use in a preferred embodiment of the instant invention designed to operate with a Doppler transmitting frequency of 50 megacycles are as follows:

| | |
|---|---|
| R30 | 51.1 ohms. |
| R34 and R42 | 17.8K ohms. |
| R36 and R40 | 6.81K ohms. |
| R49 | 1K ohm. |
| R51 | 10K ohms. |
| R52 | 475 ohms. |
| C20, C22 and C64 | 1 to 10 $\mu\mu$f. |
| C24 and C25 | 21 $\mu\mu$f. |
| C38 and C46 | 36 $\mu\mu$f. |
| C58 | 3300 $\mu\mu$f. |
| CR37 and 44 | 1N3070. |
| CR56 | 1N702. |
| Q48 | 2N917. |
| L28 | 0.15 microhenry. |

Component values for other operating frequencies may be selected by following well-known engineering practices.

Obviously, many modifications and variations of the present invention are possible in the light of the above teachings. It is therefore to be understood that within the scope of the appended claims the invention may be practiced otherwise than as specifically described.

What is claimed is:

1. A phase modulator for symmetrically phase modulating a carrier frequency signal to be transmitted comprising, an oscillator source for generating an output signal of predetermined frequency, a first gate circuit connected to receive said oscillator output signal as an input and being operable selectively to opened and closed conditions for passing and blocking respectively said input signal, a delay circuit connected in circuit parallel with said first gate circuit to also receive said oscillator output signal as an input and being effective to cause a predetermined delay of said input signal, a second gate circuit connected to receive said delayed signal from said delay circuit as an input and being operable selectively to opened and closed conditions for passing and blocking respectively said delayed input signal, adding means connected to receive and add together the outputs of said first and second gate circuits to derive said carrier frequency signal to be transmitted, and control means responsive to the information to be phase modulated on said carrier frequency signal for selectively opening and closing said first and second gate circuits in such a manner that both of said first and second gate circuits are concurrently opened to represent the unmodulated state of said carrier frequency signal, whereas each of said first and second gate circuits are opened individually in succession for each bit of said information to cause equal phase advance and phase delay respectively of said carrier frequency signal during modulation for each information bit, whereby the integrated phase shift of said carrier frequency signal over the time interval of each information bit is minimized.

2. The phase modulator specified in claim 1 wherein said information to be phase modulated on said carrier frequency signal is in binary form, and wherein one binary condition is represented by opening only said first gate circuit and subsequently opening only said second gate circuit, and the other binary condition is represented by first opening only said second gate circuit and subsequently opening only said first gate circuit.

3. The phase modulator specified in claim 1 wherein said first and second gate circuits each comprise a diode whose bias is controlled by said control means, said delay circuit comprises a variable delay $\pi$ filter, and said adding means comprises a resistor connected to each of said first and second diode gate circuits.

References Cited by the Examiner

UNITED STATES PATENTS

| | | | |
|---|---|---|---|
| 2,081,577 | 5/1937 | Crosby | 332—24 X |
| 2,881,320 | 4/1959 | Goldberg | 307—88.5 |
| 2,940,042 | 6/1960 | Fisher | 307—88.5 |
| 2,963,698 | 12/1960 | Slocomb | 307—88.5 X |
| 3,196,360 | 7/1965 | Boyden | 329—145 X |

ROY LAKE, *Primary Examiner.*

ALFRED L. BRODY, NATHAN KAUFMAN, *Examiners.*